US007266433B2

(12) United States Patent
Ozawa

(10) Patent No.: US 7,266,433 B2
(45) Date of Patent: Sep. 4, 2007

(54) DATA RECORDING APPARATUS FOR VEHICLE

(75) Inventor: Tetsuya Ozawa, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 11/502,510

(22) Filed: Aug. 11, 2006

(65) Prior Publication Data

US 2007/0050109 A1 Mar. 1, 2007

(30) Foreign Application Priority Data

Aug. 23, 2005 (JP) ............................ 2005-241444

(51) Int. Cl.
*G01M 17/00* (2006.01)

(52) U.S. Cl. .......................... 701/35; 73/489; 702/187

(58) Field of Classification Search .................. 701/35; 73/489; 702/187, 141
See application file for complete search history.

(56) References Cited

U.S. PATENT DOCUMENTS 6,122,959 A * 9/2000 Hoshal et al. ................ 73/489
2007/0032930 A1 2/2007 Ozawa

FOREIGN PATENT DOCUMENTS

| | | | | |
|---|---|---|---|---|
| EP | 000621564 | A2 | * | 10/1994 |
| JP | 7-244064 | A | | 9/1995 |
| JP | 409052569 | A | * | 2/1997 |
| JP | 2007-045221 | A | | 2/2007 |

* cited by examiner

*Primary Examiner*—Mark Hellner
(74) *Attorney, Agent, or Firm*—Foley & Lardner LLP

(57) ABSTRACT

A data recording apparatus for a vehicle includes a vehicle state detecting sensor configured to detect a state of the vehicle at the time of traveling and to provide an output value, a recorder configured to record the output value of the vehicle state detecting sensor, and a controller configured to record the output value of the vehicle state detecting sensor into the recorder; the controller has a counter configured to perform counting repeatedly according to a counting frequency and a counting range which are set based on a frequency band of an output signal of the vehicle state detecting sensor, a count value recorder configured to record a count value of the counter, and a judging section configured to judge a state of the output value of the vehicle state detecting sensor.

16 Claims, 8 Drawing Sheets

FIG.6

| Sensor | Sampling Timing (=ts) | | Event Occurrence Time (=te) | | Timing Difference | | Time Difference |
|---|---|---|---|---|---|---|---|
| | First Count Value (ts1) | Second Count Value (ts2) | First Count Value (te1) | Second Count Value (te2) | First Count Value (dt1) (ts1-te1) ※1 | Second Count Value (dt2) (ts2-te2) ※2 | =dt1x0.5ms +dt2x10ms |
| Acceleration Sensor | – | – | – | – | – | – | – |
| Front Acceleration Sensor | 2 | – | 2 | – | 0 | – | 0ms |
| Central Acceleration Sensor | 4 | – | 2 | – | 2 | – | 1ms |
| Right Side Acceleration Sensor | 6 | – | 2 | – | 4 | – | 2ms |
| Left Side Acceleration Sensor | 8 | – | 2 | – | 6 | – | 3ms |
| Traveling State Detecting Sensor | – | – | – | – | – | – | – |
| Vehicle Speed Sensor | 0 | 0 | 2 | 2 | -2+20 | -2+100 | 989ms |
| Engine Rotation Speed Sensor | 0 | 1 | 2 | 2 | -2+20 | -1+100 | 999ms |
| Brake Sensor | 0 | 2 | 2 | 2 | -2+20 | 0 | 9ms |
| Accelerator Sensor | 0 | 3 | 2 | 2 | -2+20 | 1 | 19ms |

※1 : 0 When less than 1:0, 20 is added
※2 : 0 When less than 2:0, 100 is added

DATA RECORDING APPARATUS FOR VEHICLE

BACKGROUND

1. Field of the Invention

The present invention relates to a data recording apparatus for a vehicle.

2. Description of Related Art

Recently, there has been studied a data recording apparatus for a vehicle (driving recorder) that a recording apparatus referred to as a flight recorder provided in an aircraft or the like is applied to a vehicle. Such a data recording apparatus for a vehicle is configured to constantly record data regarding a traveling state of a vehicle detected by a sensor disposed in the vehicle, and objectively analyzes the factor of emergency state of the vehicle from the recorded data in the post analysis, when the vehicle reaches the emergency state which receives impulsive force of a predetermined value or more from the external, for example (hereinbelow referred to as time of occurrence of event). In such a data recording apparatus for a vehicle, it is not practical to record data of total traveling time because it requires enormous recording capacity, so data of sensor of limited time are recorded by rewriting in a rewritable recording device, and the data of limited time before the time of occurrence of the event are stored to be usable during the post analysis (reference to JP H07-244064A). In addition, the present inventor has been proposed a data recording apparatus for a vehicle capable of recording data of limited time after the time of occurrence of the event (reference to JP 2005-229587).

By the way, for the above data recording devices, generally, output signals of a plurality of sensors such as an acceleration sensor and a vehicle speed sensor, which detects impulsive force applied externally to a vehicle, are often recorded at the same sampling interval. In this case, the sampling interval is set to the fastest sampling interval in sampling intervals required for reproducing each of the output signals based on the frequency range of output signal of each of the sensors. For example, the frequency range of output signal of the acceleration sensor has higher frequency element than the frequency range of the output signal of the vehicle speed sensor, and requires a fast sampling interval. However, if the sampling interval is set as just described, a sensor capable of reproducing an output signal at the sampling interval which is not over the set sampling interval obtains excessive data, resulting in increase in recording capacity and causing rise in costs. In addition, a load on CPU is increased by conducting unnecessary sampling and a high-speed CPU is required, also resulting in rise in costs.

Moreover, it is not always true that the time of occurrence of the event corresponds with the sampling timing. If the time differences between the time of occurrence of the event and the sampling timing are not known in the post analysis, highly accurate analysis can not be performed.

SUMMARY

It is, therefore, an object of the present invention to provide a data recording apparatus for a vehicle which records an output value of each of sensors according to a sampling frequency set based on a frequency range of an output signal of each of the sensors and can calculate a lag between a time point of occurrence of an event and each of sampling timing, in a data recording device for a vehicle which records an output value from a plurality of sensors.

In order to achieve the above object, a first aspect of the present invention is directed to a data recording apparatus for a vehicle comprises a vehicle state detecting sensor configured to detect a state of the vehicle at the time of traveling and to provide an output value, a recorder configured to record the output value of the vehicle state detecting sensor, and a controller configured to record the output value of the vehicle state detecting sensor into the recorder; the controller includes a counter configured to perform counting repeatedly according to a counting frequency and a counting range which are set based on a frequency band of an output signal, including the output value, of the vehicle state detecting sensor, a count value recorder configured to record a count value of the counter, and a judging section configured to judge a state of the output value of the vehicle state detecting sensor, wherein the controller is configured to record the output value of the vehicle state detecting sensor into the recorder every time when the count value of the counter meets a predetermined value, and wherein the controller is configured to record the count value of the counter, at a time point in which the output value of the vehicle state detecting sensor has satisfied a predetermined condition, into the count value recorder, when the judging section has judged that the output value of the vehicle state detecting sensor satisfies the predetermined condition.

According to the above structure, the output value of the vehicle state detecting sensor is recorded in the recorder every time when the count value of the counter meets the predetermined value. In addition, the time point in which the output value of the vehicle state detecting sensor has satisfied the predetermined condition is adopted as a time point of occurrence of an event, and the count value at the time point of occurrence of the event is recorded in the count value recorder. Thus, it is possible to calculate the time differences between the time point of occurrence of the event and the time point in which the output value of the vehicle state detecting sensor has been recorded in the recorder. Therefore, it is possible to perform a post-analysis with high accuracy.

The following (1) to (6) are preferred embodiments of the data recording apparatus for a vehicle according to the present invention. Any combinations of (1) to (6) are also preferred embodiments of the data recording apparatus for a vehicle according to the present invention, unless any contradiction occurs.

(1) The vehicle state detecting sensor comprises a plurality of vehicle state detecting sensors each having the equal frequency band of the output signal, and the predetermined value of the count value is individually set for each of the plurality of vehicle state detecting sensors.

(2) The vehicle state detecting sensor comprises a plurality of vehicle state detecting sensors each having the equal frequency band of the output signal, the predetermined value of the count value is set for each of the plurality of vehicle state detecting sensors and the predetermined value of the count value set for each of the plurality of vehicle state detecting sensors is different each other.

According to the above structure, the output values of a plurality of vehicle state detecting sensors can be recorded in the recorder at different timings. Therefore, it is possible to suppress the increase in a load on the controller. Thereby, an expensive CPU which performs high-speed operation becomes unnecessary, so that it is possible to attain the suppression of rise in costs.

(3) The vehicle state detecting sensor comprises a plurality of vehicle state detecting sensors each having the different frequency band of the output signal, and the counter comprises a plurality of counters, the counting frequency and the counting range of each of the plurality of counters being set based on the frequency band and count timing of each of the plurality of counters being synchronized each other, and wherein the predetermined value of the count value is individually set to the counter corresponding to each of the plurality of vehicle state detecting sensors.

(4) The vehicle state detecting sensor comprises a plurality of vehicle state detecting sensors each having the different frequency band of the output signal, and the counter comprises a plurality of counters, the counting frequency and the counting range of each of the plurality of counters being set based on the frequency band and count timing of each of the plurality of counters being synchronized each other, and wherein the predetermined value of the count value is set to the counter corresponding to each of the plurality of vehicle state detecting sensors, the predetermined value of the count value set to the counter corresponding to each of the plurality of vehicle state detecting sensors is different each other, and the count timing that the count value of each of the plurality of counters meets the predetermined value does not overlap each other.

According to the above structure, the output values of a plurality of vehicle state detecting sensors can be recorded in the recorder at different timings. Therefore, it is possible to suppress the increase in a load on the controller. Thereby, an expensive CPU which performs high-speed operation becomes unnecessary, so that it is possible to attain the suppression of rise in costs.

In addition, a plurality of counters are set in accordance with the frequency bands of the output signals of a plurality of vehicle state detecting sensors, so as to perform the recording according to appropriate sampling frequencies. Accordingly, excessive data are not recorded, and hence, it is possible to avoid the increase in recording capacity.

(5) The vehicle state detecting sensor comprises an acceleration sensor which detects impulsive force applied externally to the vehicle.

According to the above structure, a post-analysis can be conducted for an acceleration state when impulsive force is externally applied to a vehicle.

(6) The vehicle state detecting sensor comprises an acceleration sensor which detects impulsive force applied externally to the vehicle and a traveling state detecting sensor which detects a traveling state of the vehicle.

According to the above structure, since the output value of the traveling state detecting sensor is recorded with the output value of the acceleration sensor, the state of vehicle at the time of occurrence of the event can be known in details. Therefore, it is possible to perform a post-analysis with high accuracy.

A second aspect of the present invention is directed to a data recording apparatus for a vehicle comprises an acceleration sensor configured to detect impulsive force applied externally to the vehicle, a traveling state detecting sensor configured to detect a traveling state of the vehicle, a recorder configured to record an output value of each of the acceleration sensor and the traveling state detecting sensor, a controller configured to record the output value of each of the acceleration sensor and the traveling state detecting sensor into the recorder; the controller includes a first counter configured to perform counting repeatedly according to a first counting frequency and a first counting range which are based on a frequency band of an output signal, including the output value, of the acceleration sensor, a second counter configured to perform counting repeatedly, in synchronization with count timing of the first counter, according to a second counting frequency and a second counting range which are based on a frequency band of an output signal, including the output value, of the traveling state detecting sensor, a count value recorder configured to record a count value of each of the first counter and the second counter, and a judging section configured to judge a state of the output value of the acceleration sensor, wherein the controller is configured to record the output value of the acceleration sensor into the recorder every time when the count value of the first counter meets a first predetermined value, and to record the output value of the traveling state detecting sensor into the recorder every time when the count value of the second counter meets a second predetermined value, and wherein the controller is configured to record the count value of each of the first counter and the second counter, at a time point in which the output value of the acceleration sensor has satisfied a predetermined condition, into the count value recorder, when the judging section has judged that the output value of the acceleration sensor satisfies the predetermined condition.

According to the above structure, since the output value of each of the acceleration sensor and the traveling state detecting sensor is recorded in the recorder according to appropriate sampling frequencies, excessive data is not recorded. Therefore, it is possible to avoid the increase in recording capacity.

In addition, the time point in which the output value of acceleration sensor has satisfied the predetermined condition is adopted as a time point of occurrence of an event, and the count value of each of the first counter and the second counter at the time point of occurrence of the event is recorded. Accordingly, it is possible to calculate the time differences between the time point of occurrence of the event and the time point that the output value of each of the acceleration sensor and the traveling state sensor is recorded in the recorder. Therefore, it is possible to perform a post-analysis with high accuracy.

The following (1) to (7) are preferred embodiments of the data recording apparatus for a vehicle according to the present invention. Any combinations of (1) to (7) are also preferred embodiments of the data recording apparatus for a vehicle according to the present invention, unless any contradiction occurs.

(1) The acceleration sensor comprises a plurality of acceleration sensors, and the first predetermined value of the first counter is individually set for each of the plurality of acceleration sensors, and wherein the traveling state detecting sensor comprises a plurality of traveling state detecting sensors, and the second predetermined value of the second counter is individually set for each of the plurality of traveling state detecting sensors.

(2) The acceleration sensor comprises a plurality of acceleration sensors, the first predetermined value of the first counter is set for each of the plurality of acceleration sensors, and the first predetermined value of the first counter set for each of the plurality of acceleration sensors is different each other, wherein the traveling state detecting sensor comprises a plurality of traveling state detecting sensors, the second predetermined value of the second counter is set for each of the plurality of traveling state detecting sensors, and the second predetermined value of the second counter set for each of the plurality of traveling state detecting sensors is different each other, and wherein count timing that the count value of the first counter meets the first predetermined value does not overlap with count timing that the count value of the second counter meets the second predetermined value.

According to the above structure, the output values of a plurality of acceleration sensors and the output values of a plurality of traveling state detecting sensors can be recorded in the recorder at different timings. Therefore, it is possible to suppress the increase in a load on the controller. Thereby, an expensive CPU which performs high-speed operation becomes unnecessary, so that it is possible to attain the suppression of rise in costs.

(3) The acceleration sensor comprises at least one of a front acceleration sensor which is disposed near the front of the vehicle and detects impulsive force from the front of the vehicle, a central acceleration sensor which is disposed near the center of the vehicle and detects impulsive force from the front, right side and left side of the vehicle, a right side acceleration sensor which is disposed near the right side of the vehicle and detects impulsive force from the right side of the vehicle, and a left side acceleration sensor which is disposed near the left side of the vehicle and detects impulsive force from the left side of the vehicle.

According to the above structure, acceleration that a vehicle receives when impulsive force is externally applied to the vehicle can be recorded as acceleration in a plurality of directions. Thus, it is possible to perform a post-analysis with high accuracy.

(4) The traveling state detecting sensor comprises at least one of a vehicle speed sensor which detects a vehicle speed of the vehicle, an engine rotation sensor which detects the number of rotation of a engine provided in the vehicle, a brake sensor which detects on and off of a brake of the vehicle and an accelerator sensor which detects an open degree of an accelerator of the vehicle.

According to the above structure, since the output value of the traveling state detecting sensor is recorded with the output value of the acceleration sensor, the state of vehicle at the time of occurrence of the event can be known in details. Therefore, it is possible to perform a post-analysis with high accuracy.

(5) The predetermined condition is that an output value of a specific vehicle state detecting sensor meets a predetermined value or more.

According to the above structure, when the output value of unprescribed vehicle state detecting sensor meets the predetermined value or more is adopted as a time point of occurrence of an event. Accordingly, it is possible to calculate the time differences between the time point of occurrence of the event and the time point that the output value of the vehicle state detecting sensor is recorded in the recorder. Therefore, it is possible to perform a post-analysis with high accuracy.

(6) The predetermined condition is that the output value of the acceleration sensor meets a predetermined value or more.

According to the above structure, when the output value of acceleration meets a predetermined value or more is adopted as a time point of occurrence of an event. Accordingly, it is possible to calculate the time differences between the time point of occurrence of the event and the time point that the output value of the vehicle state detecting sensor is recorded in the recorder. Therefore, it is possible to perform a post-analysis with high accuracy.

(7) The predetermined condition is that at least one of an output value of the front acceleration sensor, an output value of the central acceleration sensor, an output value of right side acceleration sensor and an output value of the left side acceleration sensor meets a predetermined value or more.

According to the above structure, when at least one of the output values of a plurality of acceleration sensors meets the predetermined value or more is adopted as a time point of occurrence of an event is. Accordingly, it is possible to calculate the time differences between the time point of occurrence of the event and the time point that the output value of the vehicle state detecting sensor is recorded in the recorder. Therefore, it is possible to perform a post-analysis with high accuracy.

According to the present invention, it is possible to achieve a data recording apparatus for a vehicle which records an output value of each of sensors according to a sampling frequency set based on a frequency range of an output signal of each of the sensors and can calculate a lag between a time point of occurrence of an event and each of sampling timings, in a data recording device for a vehicle which records an output value from a plurality of sensors.

BRIEF DESCRIPTION OF THE DRAWINGS

FIG. 6 is a diagram explaining another operation of the embodiment of the present invention.

DESCRIPTION OF THE PREFERRED EMBODIMENTS

Reference will now be made in detail to the present preferred embodiments of the invention, examples of which are illustrated in the accompanying drawings. The scope of the present invention, however, is not limited to these embodiments. Within the scope of the present invention, any structure and material described below can be appropriately modified.

Figure 1:
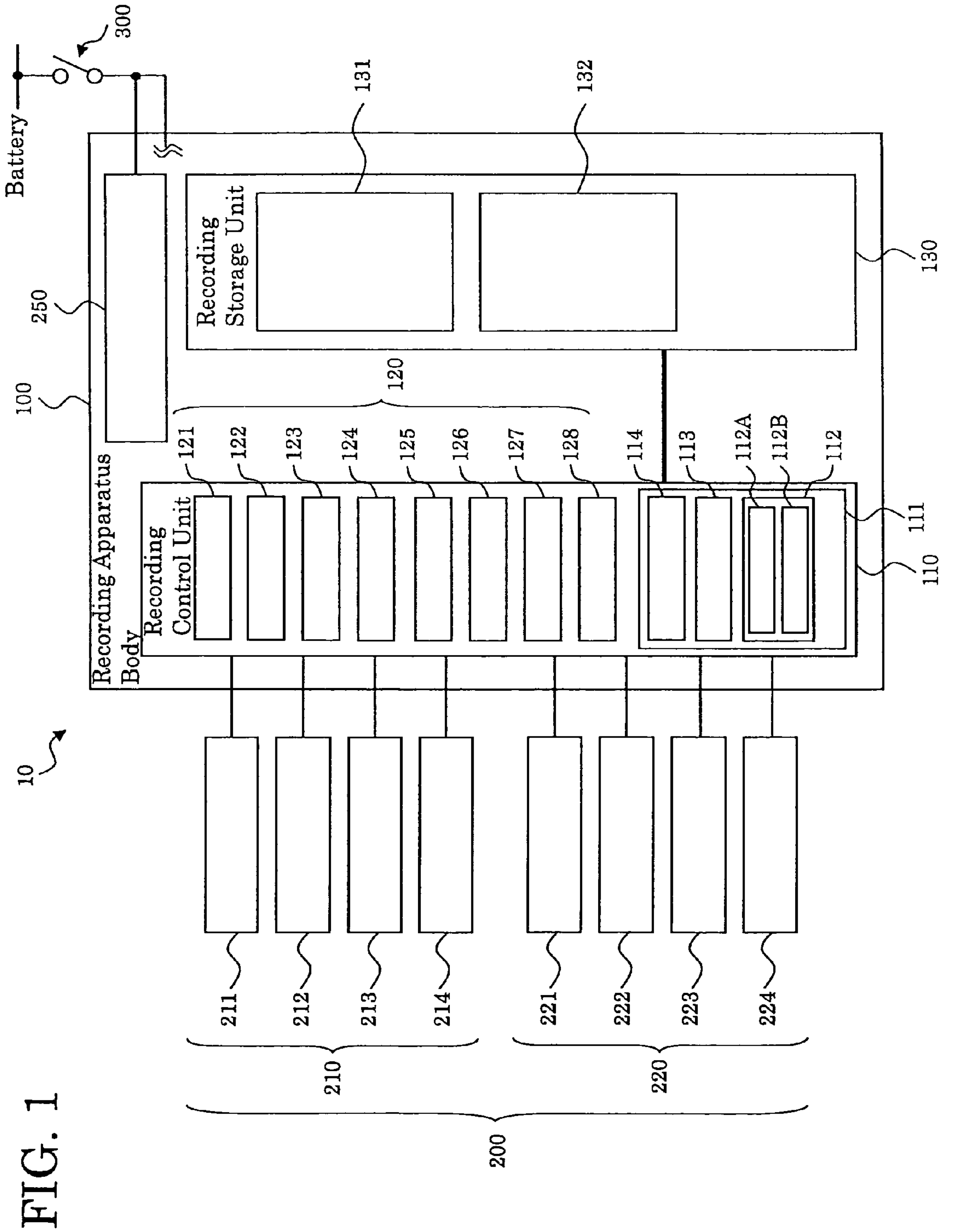
FIG. 1 is a block diagram of an embodiment of the present invention.

FIG. 1 is a block diagram of a data recording apparatus for a vehicle 10 according to a preferred embodiment of the invention.

Referring to FIG. 1, the data recording apparatus for the vehicle 10 includes a recording apparatus body 100. The recording apparatus body 100 is connected with a battery mounted in the vehicle through an ignition switch 300. The recording apparatus body 100 is provided with a backup power source 250 for coping with a case in which a connection between the recording apparatus body 100 and the battery is disconnected.

The recording apparatus body 100 is electrically connected with an acceleration sensor 210 for detecting impulsive force externally applied to the vehicle, and a traveling state detecting sensor 220 for detecting states of traveling of the vehicle. The recording apparatus 100 retrieves output values of each of the acceleration sensor 210 and the traveling state detecting sensor 220. In the present preferred embodiment, the acceleration sensor 210 and the traveling state detecting sensor 220 structure a vehicle state detecting sensor 200.

The acceleration sensor 210 can be provided with a front acceleration sensor 211 for detecting the impulsive force applied from the front of the vehicle, a central acceleration sensor 212 for detecting the impulsive force applied from each direction of the front, a right side and a left side of the vehicle, a right side acceleration sensor 213 for detecting the impulsive force applied from the right side of the vehicle, and a left side acceleration sensor 214 for detecting the impulsive force applied from the left side of the vehicle.

Figure 2:
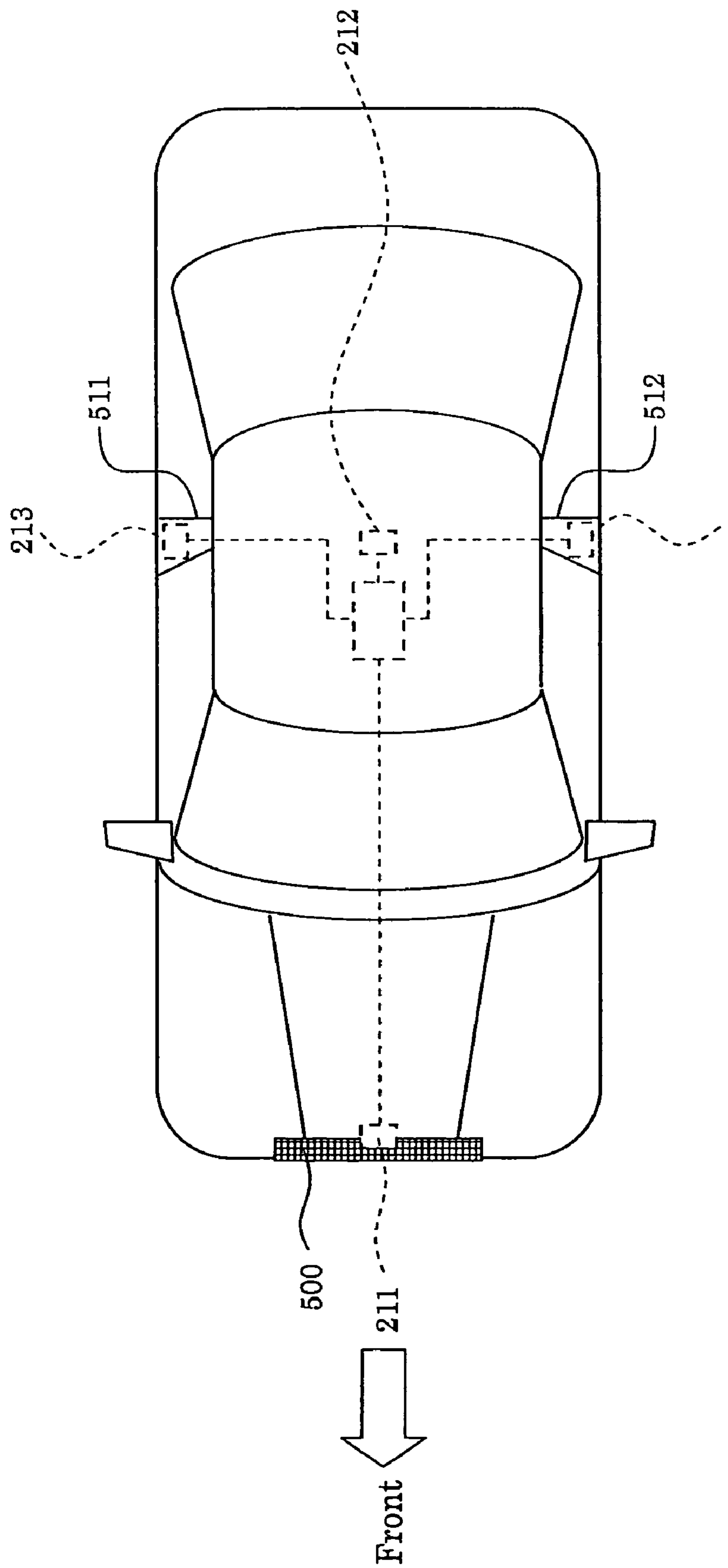
FIG. 2 is a view showing installation portions of acceleration sensors of the embodiment of the present invention.

Referring to FIG. 2, in the preferred embodiment of the invention, for example, the front acceleration sensor 211 is attached inside of a front grille 500. The central acceleration sensor 212 is attached inside of a center console (not shown) arranged substantially in the center of the vehicle. The right side acceleration sensor 213 is attached within a right B-pillar 511 of the vehicle. The left side acceleration sensor 214 is attached within a left B-pillar 512 of the vehicle. It is to be noted that the arrangement of these sensors is exemplary, and can be suitably changed according to need.

The traveling state detecting sensor 220 can be provided with a vehicle speed sensor 221 for detecting a speed of the vehicle, an engine rotational speed sensor 222 for detecting the number of rotations of an engine of the vehicle, a brake sensor 223 for detecting on and off of a brake of the vehicle, and an accelerator sensor 224 for detecting an open degree of an accelerator of the vehicle.

The recording apparatus body 100 is also provided with a recording control unit 110 for performing control of recording, and a recording storage unit 130 for recording and storing the output values of the vehicle state detecting sensor 200.

The recording control unit 110 includes a controller 111 as CPU (central processing unit) for performing the control of the recording, and a recorder 120 for temporary recording the output values detected by the acceleration sensor 210 and the traveling state detecting sensor 220.

In the preferred embodiment, the recorder 120 includes a first ring buffer 121 for recording the output value of the front acceleration sensor 211, a second ring buffer 122 for recording the output value of the central acceleration sensor 212, a third ring buffer 123 for recording the output value of the right side acceleration sensor 213, and a fourth ring buffer 124 for recording the output value of the left side acceleration sensor 214. In addition, the recorder 120 includes a fifth ring buffer 125 for recording the output value of the vehicle speed sensor 221, a sixth ring buffer 126 for recording the output value of the engine rotational speed sensor 222, a seventh ring buffer 127 for recording the output value of the brake sensor 223, and an eighth ring buffer 128 for recording the output value of the accelerator sensor 224.

Each of the first to eighth ring buffers 121–128 preferably is a ring buffer having a recording capacity capable of recording the output value of the corresponding sensor for at least a time TE in both before and after of an occurrence of the event, and employs first-in first-out (FIFO) type in which old data is erased when the ring buffer has received data equals to or more than the recording capacity to retrieve new data.

The controller 111 includes a counter 112 which sets sampling timings for loading the output values of the respective sensors 211–214 and 221–224 included in the vehicle state detecting sensor 200 into the recorder 120.

Figure 5:
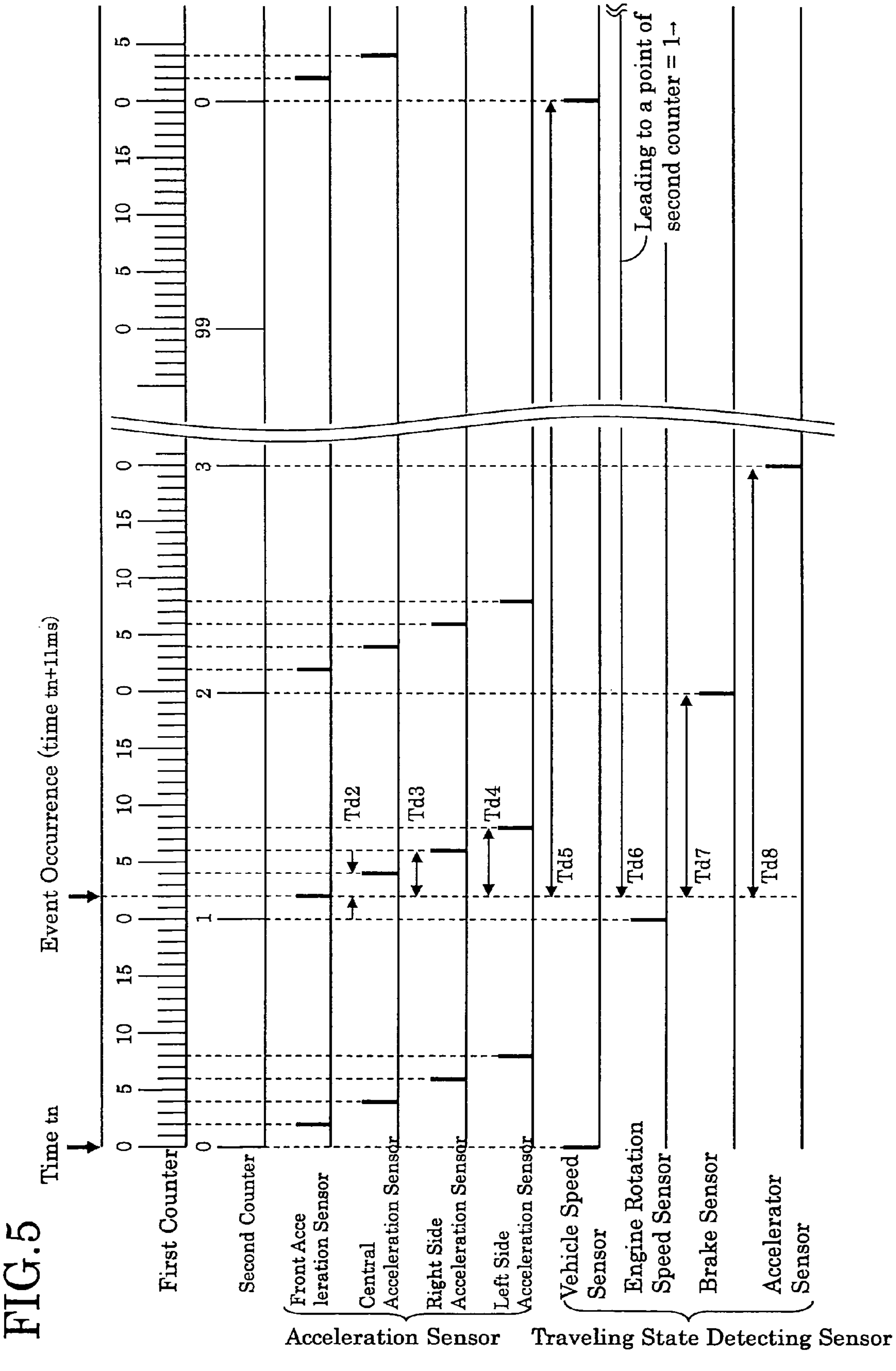
FIG. 5 is a diagram explaining operation of the embodiment of the present invention.

The counter 112 includes a first counter 112A which, for example, increments a count value at every 0.5 ms (millisecond) and returns the count value to 0 (zero) at a time point in which 10 ms have elapsed in which the count value becomes 20, wherein a value 0 (zero) is set as an initial value of the count value. The counter 112 also includes a second counter 112B which, for example, increments a count value at every 10 ms and returns the count value to 0 at a time point in which 1000 ms have elapsed in which the count value becomes 100, wherein a value 0 is set as an initial value of the count value. A counting frequency and a counting range of the first counter 112A are preferably set based on a frequency band of output signals, including the output values, of the acceleration sensor 210, in which a frequency thereof is in a few dozen Hz order. A counting frequency and a counting range of the second counter 112B are preferably set based on a frequency band of output signals, including the output values, of the traveling state detecting sensor 220, in which a frequency thereof is in a few Hz order. As shown in FIG. 5, count timing of the first counter 112A and count timing of the second counter 112B are synchronized to each other.

The output values of the front acceleration sensor 211, the central acceleration sensor 212, the right side acceleration sensor 213 and the left side acceleration sensor 214 are sampled in accordance with counting of the first counter 112A, and are loaded into the recorder 120, respectively. Referring to FIG. 5, the sampling timings for the sensors 211–214 can be so set that each of the sampling timings thereof does not overlap mutually, so as to reduce an operational load of the controller 111. For example, the output value of the front acceleration sensor 211 is loaded into the recorder 120 at the time point when the count value of the first counter 112A is 2, whereas the output value of the central acceleration sensor 212 is loaded into the recorder 120 at the time point when the count value of the first counter 112A is 4. In addition, for example, the output value of the right side acceleration sensor 213 is loaded into the recorder 120 at the time point when the count value of the first counter 112A is 6, whereas the output value of the left side acceleration sensor 214 is loaded into the recorder 120 at the time point when the count value of the first counter 112A is 8.

The output values of the vehicle speed sensor 221, the engine rotational speed sensor 222, the brake sensor 223 and the accelerator sensor 224 are sampled in accordance with counting of the second counter 112B, and are loaded into the recorder 120, respectively. The sampling timings for the sensors 221–224 can be so set that each of the sampling timings thereof does not overlap mutually, as shown in FIG. 5, so as to reduce the operational load of the controller 111. For example, the output value of the vehicle speed sensor 221 is loaded into the recorder 120 at the time point when the count value of the second counter 112B is 0 (zero), whereas the output value of the engine rotational speed sensor 222 is loaded into the recorder 120 at the time point when the count value of the second counter 112B is 1 (one). In addition, for example, the output value of the brake sensor 223 is loaded into the recorder 120 at the time point when the count value of the second counter 112B is 2, whereas the output value of the accelerator sensor 224 is loaded into the recorder 120 at the time point when the count value of the second counter 112B is 3.

Moreover, as shown in FIG. 5, the sampling timings for the output values of the front acceleration sensor 211, the central acceleration sensor 212, the right side acceleration sensor 213 and the left side acceleration sensor 214, respectively, and the sampling timings for the output values of the vehicle speed sensor 221, the engine rotational speed sensor 222, the brake sensor 223 and the accelerator sensor 224, respectively, can also be set so as not to be overlapped with each other.

The controller 111 further includes a count value recorder 113 for recording the count value of the first counter 112A and the count value of the second counter 112B that are at the time point in which the event has occurred, in a case where the event is generated which will be described later in detail.

The controller 111, moreover, includes a judging section 114 for judging whether or not, for example, the output value of the front acceleration sensor 211 is equal to or more than a predetermined value.

The recording storage unit 130 includes a output value temporary recording buffer 131, which is preferably a volatile memory, for temporary recording the output values recorded in the recorder 120, and an output value storage section 132, which is preferably a nonvolatile memory, for storing the output values recorded in the output value temporary recording buffer 131.

The output value temporary recording buffer 131, in the case where the event is occurred, records the output values of the sensors 211–214 and 221–224 recorded in the first to the eighth ring buffers 121–128, respectively, at the moment in which the event has occurred.

The output value storage section 132 records the output values recorded in the output value temporary recording buffer 131, at the moment in which the recording of the output values to the output value temporary recording buffer 131 has completed.

In the preferred embodiment of the invention, a case in which the output value of the vehicle state detecting sensor 200 has satisfied a predetermined condition is preferably the case in which the impulsive force is applied to the vehicle externally and the output value of the front acceleration sensor 211 has became equal to or more than the predetermined value, for example. When the external impulsive force is applied to the vehicle and the output value of the front acceleration sensor 211 is equal to or more than the predetermined value, in the preferred embodiment, it can be defined that such a state is the case that the event is occurred, although it is not limited thereto.

Figure 3:
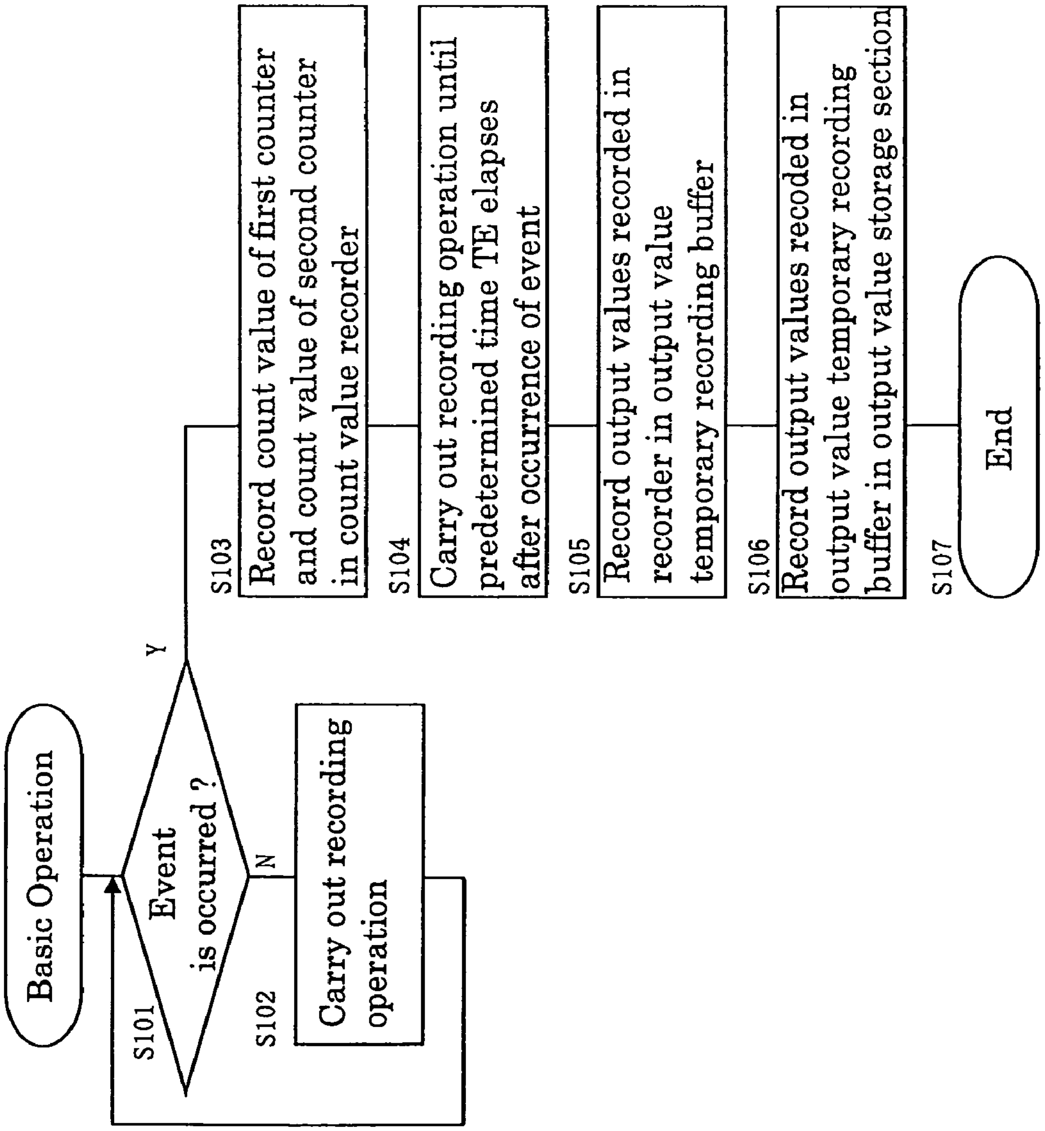
FIG. 3 is a flow chart of basic operation of a controller in the embodiment of the present invention.
Figure 4:
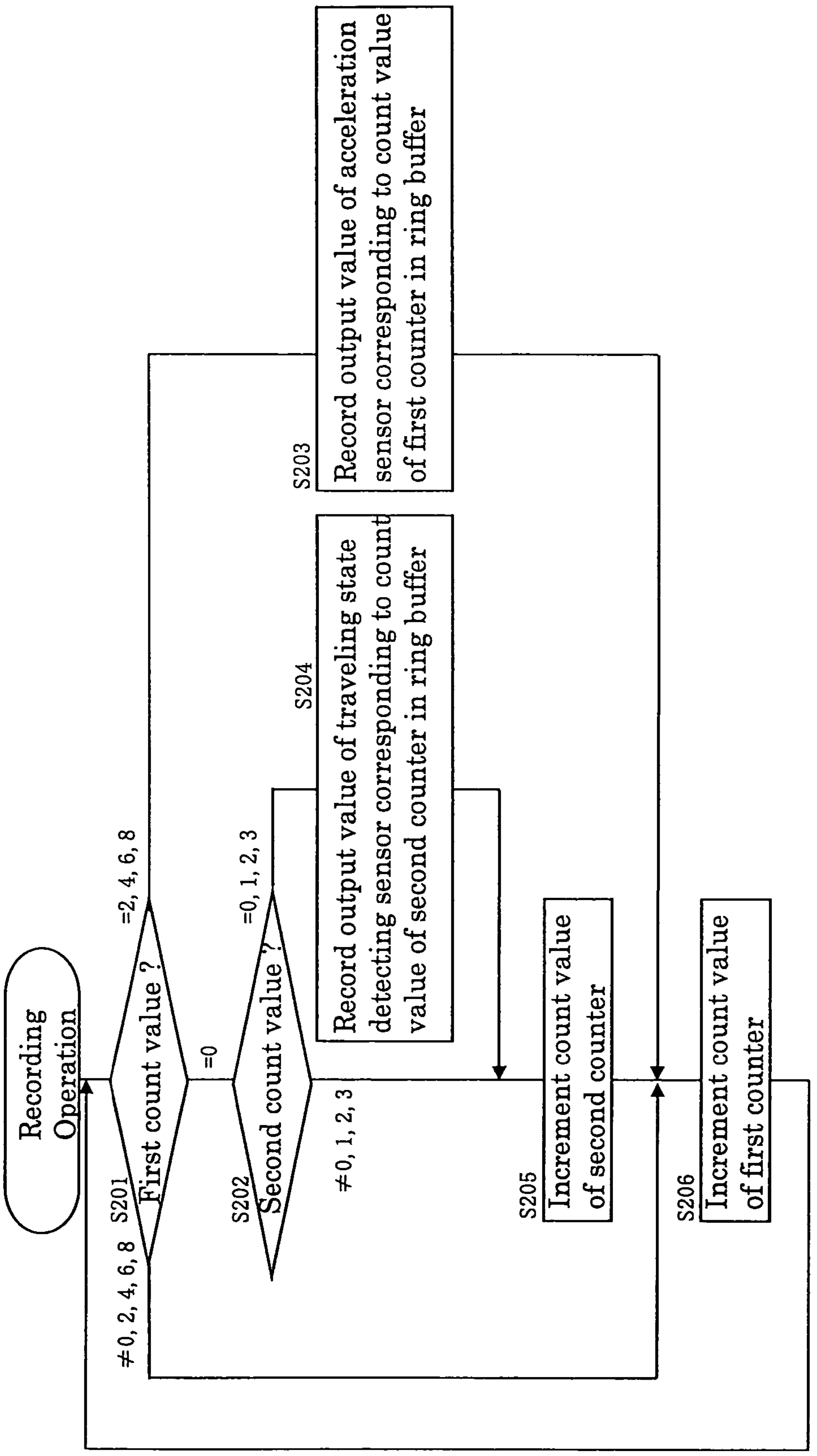
FIG. 4 is a flow chart of recording operation of a controller in the embodiment of the present invention.

Now, operation of the data recording apparatus for the vehicle 10 according to the preferred embodiment of the invention will be described with reference to flowcharts shown in FIGS. 3 and 4 together with the diagram of FIG. 5 explaining the operation thereof.

First of all, basic operation of the controller 111 will be described by referring to the flowchart of FIG. 3.

In step S101, whether or not the event is occurred is judged. When the event is occurred, in other words, when the impulsive force is externally applied to the vehicle and the value of the front acceleration sensor 211 is equal to or more than the predetermined value, a flow transits to step S103. On the other hand, when it is judged that the event is not occurred, the flow transits to step S102.

In the step S102, recording operation by which the output values of the acceleration sensor 210 and the traveling state detecting sensor 220 are recorded into the recorder 120 is carried out, which will be described later. Thereafter, the flow returns to the step S101, and the step S101 to the step S102 are repeated.

In the step S103, the count value of the first counter 112A and the count value of the second counter 112B at that time point are recorded to the count value recorder 113. Thereafter, the flow transits to step S104.

In the step S104, the recording operation mentioned above is carried out until the predetermined time TE elapses from the time point in which the event is occurred. Thereafter, the flow transits to step S105.

In the step S105, the output values of the acceleration sensor 210 and the traveling state detecting sensor 220, recorded in the first to eighth ring buffers 121–128 of the recorder 120, are recorded to the output value temporary recording buffer 131. Thereafter, the flow transits to step S106.

In the step S106, the output values of the acceleration sensor 210 and the traveling state detecting sensor 220 recorded in the output value temporary recording buffer 131 are recorded and stored into the output value storage section 132. Thereafter, the flow transits to step S107.

The basic operation of the controller 111 ends in the step S107.

By the operation described above, the output values of the acceleration sensor 210 and the traveling state detecting sensor 220 for equal to or more than the time TE before the occurrence of the event, and the output values of the acceleration sensor 210 and the traveling state detecting sensor 220 for the time TE after the occurrence of the event are recorded and stored into the recording storage unit 130.

Next, the recording operation of the controller 111 will be described by referring to the flowchart of FIG. 4.

In step S201, judgment on the count value of the first counter 112A is carried out. When it is judged that the count value of the first counter 112A is 0 (zero), a flow transits to step S202. When it is judged that the count value of the first counter 112A is 2, 4, 6 or 8, the flow transits to step S203. In addition, when it is judged that the count value of the first counter 112A is other than 0, 2, 4, 6 and 8, the flow transits to step S206.

In step S202, judgment on the count value of the second counter 112B is carried out. When it is judged that the count value of the second counter 112B is 0, 1, 2 or 3, the flow transits to step S204. On the other hand, when it is judged that the count value of the second counter 112B is other than 0, 1, 2 and 3, the flow transits to step S205.

In the step S203, the output value of one of the sensors 211–214 of the acceleration sensor 210, to which the sampling timing is set in accordance with timing corresponding to the count value of the first counter 112A, is sampled at the timing corresponding to the count value of the first counter 112A, and is recorded to the recorder 120.

More specifically, referring to FIG. 5, when the count value of the first counter 112A is 2, the output value of the front acceleration sensor 211 is sampled, and is then recorded into the first ring buffer 121. When the count value of the first counter 112A is 4, the output value of the central acceleration sensor 212 is sampled, and is then recorded into the second ring buffer 122. When the count value of the first counter 112A is 6, the output value of the right side acceleration sensor 213 is sampled, and is then recorded into the third ring buffer 123. When the count value of the first counter 112A is 8, the output value of the left side acceleration sensor 214 is sampled, and is then recorded into the fourth ring buffer 124. Here, the flow preferably transits immediately to the step S206 without waiting the recording of the output values to the respective ring buffers 121–124 to be completed.

In the step S204, the output value of one of the sensors 221–224, to which the sampling timing is set in accordance with timing corresponding to the count value of the second counter 112B, is sampled at the timing corresponding to the count value of the second counter 112B, and is recorded to the recorder 120.

More specifically, referring to FIG. 5, when the count value of the second counter 112B is 0, the output value of the vehicle speed sensor 221 is sampled, and is then recorded into the fifth ring buffer 125. When the count value of the second counter 112B is 1, the output value of the engine rotational speed sensor 222 is sampled, and is then recorded into the sixth ring buffer 126. When the count value of the second counter 112B is 2, the output value of the brake sensor 223 is sampled, and is then recorded into the seventh ring buffer 127. When the count value of the second counter 112B is 3, the output value of the accelerator sensor 224 is sampled, and is then recorded into the eighth ring buffer 128. Here, the flow preferably transits immediately to the step S206 without waiting the recording of the output values to the respective ring buffers 125–128 to be completed.

In the step S205, the count value of the second counter 112B is incremented. The count value of the second counter 112B, for example, adopts values from 0 (zero) to 99, and the value returns to 0 to be counted after the value of 99 is counted. Thereafter, the flow transits to the step S206.

In the step S206, the count value of the first counter 112A is incremented. The count value of the first counter 112A, for example, adopts values from 0 (zero) to 19, and the value returns to 0 to be counted after the value of 19 is counted. Thereafter, the flow returns to the step S201, and the step S201 to the step S206 are repeated.

Here, as shown in FIG. 5, for example, when the output value of the front acceleration sensor 211 becomes equal to or more than the predetermined value in time tn+11 ms and the judging section 114 judges that the event has occurred, the initial count values from the time point of the occurrence of the event is recorded into the count value recorder 113. In this case, the value of 2 of the first counter 112A and the value of 2 of the second counter 112B are recorded into the count value recorder 113.

As already mentioned above, the sampling of the front acceleration sensor 211 is performed at the time point in which the count value of the first counter 112A is 2, and the sampling of the central acceleration sensor 212 is performed at the time point in which the count value of the first counter 112A is 4. In addition, the sampling of the right side acceleration sensor 213 is performed at the time point in which the count value of the first counter 112A is 6, and the sampling of the left side acceleration sensor 214 is performed at the time point in which the count value of the first counter 112A is 8.

Also, in the present preferred embodiment, the sampling of the vehicle speed sensor 221 is performed at the time point in which the count value of the first counter 112A is 0 (zero) and the count value of the second counter 112B is 0 (zero). The sampling of the engine rotational speed sensor 222 is performed at the time point in which the count value of the first counter 112A is 0 and the count value of the second counter 112B is 1. The sampling of the brake sensor 223 is performed at the time point in which the count value of the first counter 112A is 0 and the count value of the second counter 112B is 2. In addition, the sampling of the accelerator sensor 224 is performed at the time point in which the count value of the first counter 112A is 0 and the count value of the second counter 112B is 3.

Accordingly, when the count value of the first counter 112A and the count value of the second counter 112B at the time of the occurrence of the event are identified, it is possible to calculate time differences between the time of the occurrence of the event and each of the sampling timings of the acceleration sensor 210 and the traveling state detecting sensor 220 (for example, td2 to td8 shown in FIG. 5).

FIG. 6 shows the count values of the first counter 112A and the second counter 112B in each of the sampling timings of the acceleration sensor 210 and the traveling state detecting sensor 220, the count values of the first counter 112A and the second counter 112B at the time of occurrence of the event, and the time differences between the time of the occurrence of the event and the sampling timings calculated from the count values.

For example, the sampling timing of the central acceleration sensor 212 is performed when the count value of the first counter 112A (hereinafter referred to as a first counter value) is 4. In addition, the time of the occurrence of the event amounts to the first counter value=2. Under such circumstances, when the time difference between the sampling timing of the central acceleration sensor 212 and the time of the occurrence of the event is represented by the count value, the first counter value=2 is obtained. Here, when that first counter value is converted into time, it can be found that the sampling of the central acceleration sensor 212 has been performed after 1 ms from the time of the occurrence of the event, i.e., td2=1 ms is obtained, since the value 1 (one) of the first counter value is equivalent to 0.5 ms.

In addition, the sampling timing of the right side acceleration sensor 213 is performed when the first counter value is 6, and the time of the occurrence of the event amounts to the first counter value=2. When the time difference between the sampling timing of the right side acceleration sensor 213 and the time of the occurrence of the event is represented by the count value, the first counter value=4 is obtained. Therefore, it can be found that the sampling of the right side acceleration sensor 213 has been performed after 2 ms from the time of the occurrence of the event, i.e. td3=2 ms is obtained.

Moreover, the sampling timing of the left side acceleration sensor 214 is performed when the first counter value is 8, and the time of the occurrence of the event amounts to the first counter value=2. When the time difference between the sampling timing of the left side acceleration sensor 214 and the time of the occurrence of the event is represented by the count value, the first counter value=6 is obtained. Therefore, it can be found that the sampling of the left side acceleration sensor 214 has been performed after 3 ms from the time of the occurrence of the event, i.e. td4=3 ms is obtained. The sampling timing of the vehicle speed sensor 221 is performed when the first counter value is 0 and the count value of the second counter 112B (hereinafter referred to as a second counter value) is 0. Here, the time of the occurrence of the event amounts to the first counter value=2 and the second counter value=2. Hence, when the time difference between the sampling timing of the vehicle speed sensor 221 and the time of the occurrence of the event is represented by the count value, the first counter value=18 and the second counter value=98 are obtained, since when the count value of the first counter value is subtracted, the count value becomes −2 and thus the value turns out to be less than 0, so that values of 20 are added thereto for the first counter value, whereas when the count value of the second counter value is subtracted, the count value becomes −2 and thus the value turns out to be less than 0, so that values of 100 are similarly added thereto for the second counter value. When the first counter value and the second counter value are converted into time, it can be found that the sampling of the vehicle speed sensor 221 has been performed after 989 ms from the time of the occurrence of the event, i.e. td5=989 ms is obtained, since the value 1 (one) of the first counter value is equivalent to 0.5 ms as mentioned above and the value 1 of the second counter value is equivalent to 10 ms.

The sampling timing of the engine rotational speed sensor 222 is performed when the first counter value is 0 and the second counter value is 1. Here, the time of the occurrence of the event amounts to the first counter value=2 and the second counter value=2. Hence, when the time difference between the sampling timing of the engine rotational speed sensor 222 and the time of the occurrence of the event is represented by the count value, the first counter value=18 and the second counter value=99 are obtained, since when the count value of the first counter value is subtracted, the count value becomes −2 and thus the value turns out to be less than 0, so that values of 20 are added thereto for the first counter value, whereas when the count value of the second counter value is subtracted, the count value becomes −1 and thus the value turns out to be less than 0, so that values of 100 are similarly added thereto for the second counter value. Therefore, it can be found that the sampling of the engine rotational speed sensor 222 has been performed after 999 ms from the time of the occurrence of the event, i.e. td6=999 ms is obtained.

In addition, the sampling timing of the brake sensor 223 is performed when the first counter value is 0 and the second counter value is 2. Here, the time of the occurrence of the event amounts to the first counter value=2 and the second counter value=2. Hence, when the time difference between the sampling timing of the brake sensor 223 and the time of the occurrence of the event is represented by the count value, the first counter value=18 and the second counter value=0 are obtained, since when the count value of the first counter value is subtracted, the count value becomes −2 and thus the value turns out to be less than 0, so that values of 20 are added thereto for the first counter value. Therefore, it can be found that the sampling of the brake sensor 223 has been performed after 9 ms from the time of the occurrence of the event, i.e. td7=9 ms is obtained.

In addition, the sampling timing of the accelerator sensor 224 is performed when the first counter value is 0 and the second counter value is 3. Here, the time of the occurrence of the event amounts to the first counter value=2 and the second counter value=2. Hence, when the time difference between the sampling timing of the accelerator sensor 224 and the time of the occurrence of the event is represented by the count value, the first counter value=18 and the second counter value=1 are obtained, since when the count value of the first counter value is subtracted, the count value becomes −2 and thus the value turns out to be less than 0, so that values of 20 are added thereto for the first counter value. Therefore, it can be found that the sampling of the accelerator sensor 224 has been performed after 19 ms from the time of the occurrence of the event, i.e. td8=19 ms is obtained.

As described above, there can be a case in which the time difference is generated between the time of the occurrence of the event and the sampling timing of each of the sensors 211–214 and 221–224 of the vehicle state detecting sensor 200. In such a case, the output value of each of the sensors 211–214 and 221–224 of the vehicle state detecting sensor 200 at the time in which the event has actually occurred has not been recorded. However, the sampling frequency of each of the sensors 211–214 and 221–224 of the vehicle state detecting sensor 200 is set in a value capable of recreating a frequency characteristic of each output signal of the vehicle state detecting sensor 200. Therefore, it is possible to calculate an estimated value of the output value of the sensors 211–214 and 221–224 of the vehicle state detecting sensor 200, with respect to the output value at the time in which the recording of the output value has not been performed, from recorded values before and after of the time in which the recording thereof has not been performed by utilizing a proportional expression.

If the calculation of the estimated value of the output value is considered by graphing the output value of one of the sensors 211–214 and 221–224 of the vehicle state detecting sensor 200, when the time of the occurrence of the event is represented as a time axis, it can be seen that the graph of the output value of that one of the sensors 211–214 and 221–224 of the vehicle state detecting sensor 200 is to be moved by the time difference between the time of the occurrence of the event and the sampling timing of that one of the sensors 211–214 and 221–224 of the vehicle state detecting sensor 200 in a direction of the time axis.

Figure 7:
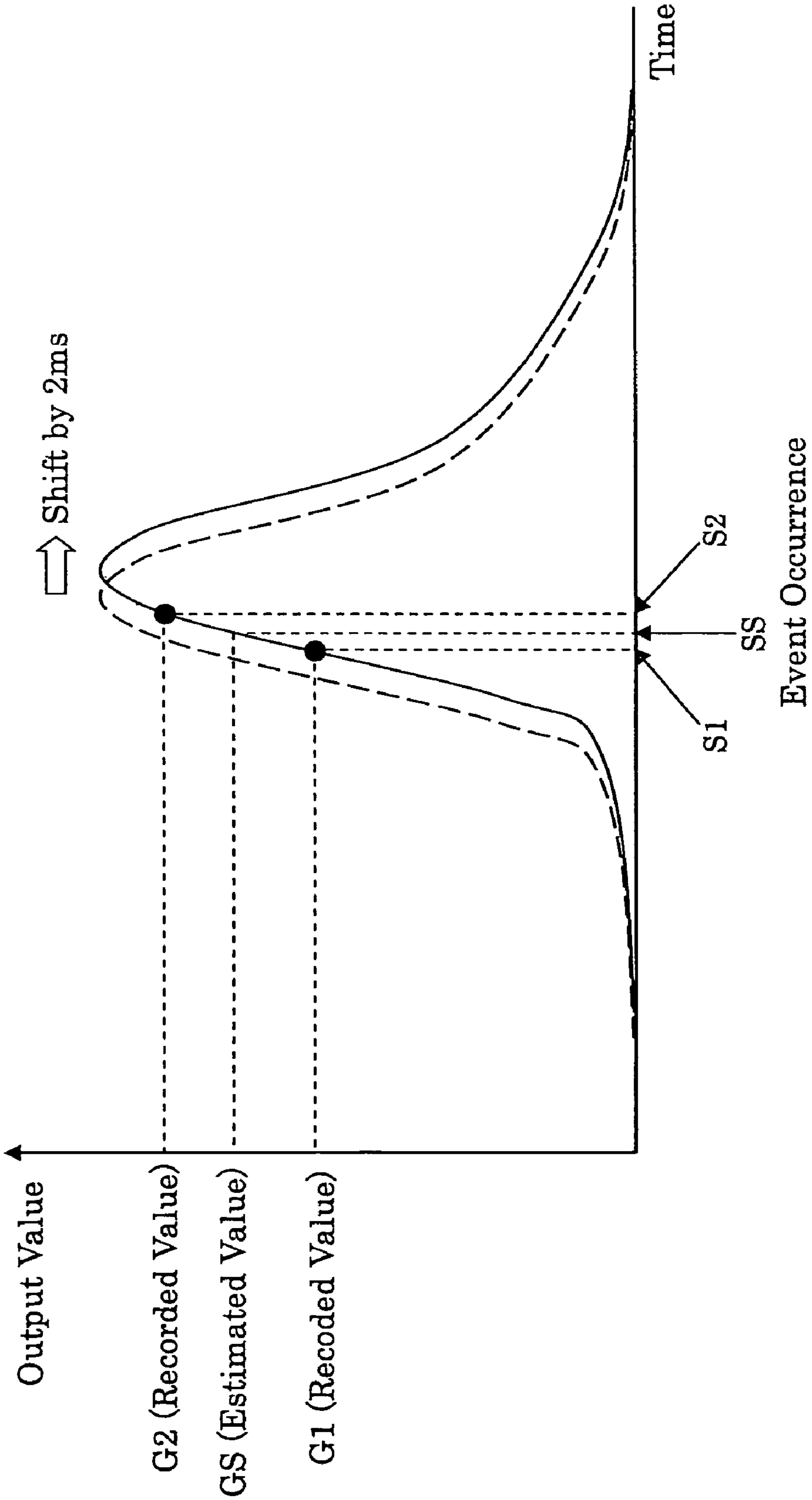
FIG. 7 is a diagram explaining another operation of the embodiment of the present invention.

FIG. 7 shows one example of a graph of the output value of the right side acceleration sensor 213 according to the preferred embodiment of the invention. As described above, in the case in which the sampling timing of the right side acceleration sensor 213 is after 2 ms from the time of the occurrence of the event, a graph of the time of the occurrence of the event and the sampling timing having the arranged time axis is obtained, by shifting the graph of the output value of the right side acceleration sensor 213 by 2 ms to the right in FIG. 7. In this case, an estimated value GS of the output value of the right side acceleration sensor 213 in an event occurrence time SS can be calculated by utilizing a recorded value G1 in time S1 and a recorded value G2 in time S2 before and after of the event occurrence time SS, with, for example but not limited to, a proportional expression of:

$$GS=((G2-G1)/(S2-S1))\times(SS-S1)+G1$$

Figure 8:
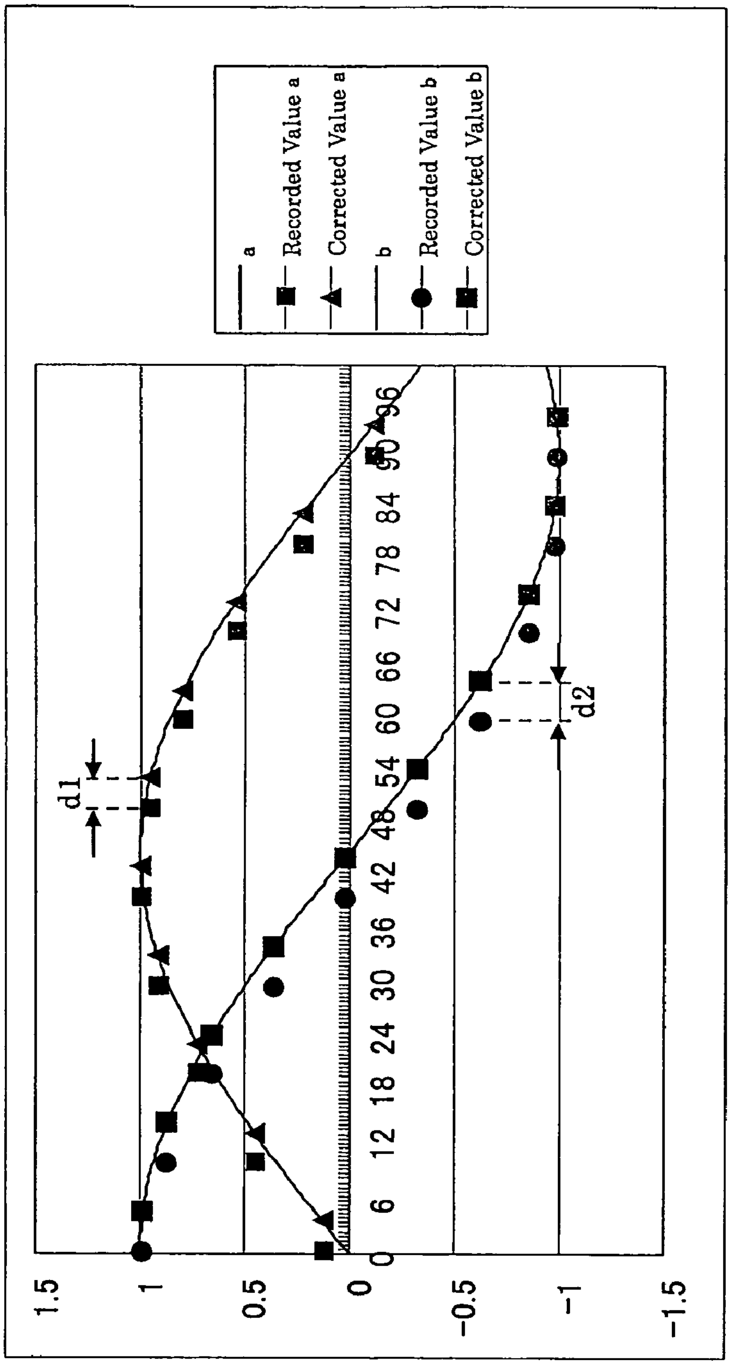
FIG. 8 is a diagram explaining another operation of the embodiment of the present invention.

FIG. 8 shows an example of a result of simulation in which a sine wave and a cosine wave having the sampling timings after 3.5 ms and 4.5 ms from the time of the occurrence of the event, respectively, are displayed by matching the time of the occurrence of the event and the time axis. Note that d1=3.5 ms and d2=4.5 ms are shown in FIG. 8.

As described in the foregoing, therefore, the output values of the vehicle state detecting sensor such as the acceleration sensor 210 and the traveling state detecting sensor 220 are sampled by the counter which performs the counting with the sampling frequencies most suitable for the respective sensors. Thus, performing of unnecessary sampling is not required, and hence, it is possible to avoid increase in a recording capacity. Thereby, a high-capacity recording apparatus becomes unnecessary to achieve suppression of rise in costs.

In addition, the sampling timings are set such that each of the sampling timing does not overlap with each other. Accordingly, it is possible to suppress increase in a load on the controller 111, i.e. CPU. Thereby, high-speed CPU becomes unnecessary, so that it is possible to further attain the suppression of rise in costs.

Also, the count values of the counter 112 at the time of the occurrence of the event are recorded. Thus, it is possible to calculate the time differences between the time of the occurrence of the event and each of the sampling timings of the vehicle state detecting sensor 200 when post-analysis is carried out. Therefore, it is possible to perform the analysis having high accuracy.

Although the preferred embodiment of the invention has been described in the foregoing, it is to be noted that the definition of the case in which the event is occurred is not limited to the states set in the present preferred embodiment, and other states can be set as the case in which the event is occurred, such as a case in which the output value of the central acceleration sensor 212 becomes equal to or more than the predetermined value for example.

Also, the counting frequencies and the counting ranges of the first and second counters 112A and 112B are not limited to the values set in the present preferred embodiment. Other values can be set based on the sampling frequencies suitable for the respective sensors of the vehicle state detecting sensor 200.

Furthermore, positions of the sensors of the vehicle state detecting sensor 200 attached, the number of the sensors and so on are not limited to the positions described in the present preferred embodiment.

Moreover, the sensors of the traveling state detecting sensor 220 are not limited to the sensors 221–224 described in the present preferred embodiment. Other sensors adapted to detect the traveling states of the vehicle can be employed.

In addition, the output values of the traveling state detecting sensor 220 can be loaded via a network, such as CAN (Controller Area Network) as a standard of a distributed control network.

The block diagram of the drawings is not limited to FIG. 1 according to the present preferred embodiment of the invention.

The present application is based on and claims priority from Japanese Patent Application Serial No. 2005-241444, filed Aug. 23, 2005, the disclosure of which is hereby incorporated by reference herein in its entirety.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based the language employed in the claims and not limited to examples described in the present specification or during the prosecution of the application, which examples are to be construed as non-exclusive. For example, in the present disclosure, the term "preferably", "preferred" or the like is non-exclusive and means "preferably", but not limited to. Moreover, no element and component in the present disclosure is intended to be dedicated to the public regardless of whether the element or component is explicitly recited in the following claims.

What is claimed is:

1. A data recording apparatus for a vehicle, comprising:

a vehicle state detecting sensor configured to detect a state of the vehicle at the time of traveling and to provide an output value;

a recorder configured to record the output value of the vehicle state detecting sensor; and a controller configured to record the output value of the vehicle state detecting sensor into the recorder, the controller including:

a counter configured to perform counting repeatedly according to a counting frequency and a counting range which are set based on a frequency band of an output signal of the vehicle state detecting sensor;

a count value recorder configured to record a count value of the counter; and a judging section configured to judge a state of the output value of the vehicle state detecting sensor, wherein the controller is configured to record the output value of the vehicle state detecting sensor into the recorder every time when the count value of the counter meets a predetermined value, and wherein the controller is configured to record the count value of the counter, at a time point in which the output value of the vehicle state detecting sensor has satisfied a predetermined condition, into the count value recorder, when the judging section has judged that the output value of the vehicle state detecting sensor satisfies the predetermined condition.

2. The data recording apparatus for a vehicle according to claim 1, wherein the vehicle state detecting sensor comprises a plurality of vehicle state detecting sensors each having the equal frequency band of the output signal, and the predetermined value of the count value is individually set for each of the plurality of vehicle state detecting sensors.

3. The data recording apparatus for a vehicle according to claim 1, wherein the vehicle state detecting sensor comprises a plurality of vehicle state detecting sensors each having the equal frequency band of the output signal, the predetermined value of the count value is set for each of the plurality of vehicle state detecting sensors and the predetermined value of the count value set for each of the plurality of vehicle state detecting sensors is different each other.

4. The data recording apparatus for a vehicle according to claim 1, wherein the vehicle state detecting sensor comprises a plurality of vehicle state detecting sensors each having the different frequency band of the output signal, and the counter comprises a plurality of counters, the counting frequency and the counting range of each of the plurality of counters being set based on the frequency band and count timing of each of the plurality of counters being synchronized each other, and wherein the predetermined value of the count value is individually set to the counter corresponding to each of the plurality of vehicle state detecting sensors.

5. The data recording apparatus for a vehicle according to claim 1, wherein the vehicle state detecting sensor comprises a plurality of vehicle state detecting sensors each having the different frequency band of the output signal, and the counter comprises a plurality of counters, the counting frequency and the counting range of each of the plurality of counters being set based on the frequency band and count timing of each of the plurality of counters being synchronized each other, and wherein the predetermined value of the count value is set to the counter corresponding to each of the plurality of vehicle state detecting sensors, the predetermined value of the count value set to the counter corresponding to each of the plurality of vehicle state detecting sensors is different each other, and the count timing that the count value of each of the plurality of counters meets the predetermined value does not overlap each other.

6. The data recording apparatus for a vehicle according to claim 1, wherein the vehicle state detecting sensor comprises an acceleration sensor which detects impulsive force applied externally to the vehicle.

7. The data recording apparatus for a vehicle according to claim 1, wherein the vehicle state detecting sensor comprises an acceleration sensor which detects impulsive force applied externally to the vehicle and a traveling state detecting sensor which detects a traveling state of the vehicle.

8. A data recording apparatus for a vehicle, comprising:

an acceleration sensor configured to detect impulsive force applied externally to the vehicle;

a traveling state detecting sensor configured to detect a traveling state of the vehicle;

a recorder configured to record an output value of each of the acceleration sensor and the traveling state detecting sensor;

a controller configured to record the output value of each of the acceleration sensor and the traveling state detecting sensor into the recorder, the controller including:

a first counter configured to perform counting repeatedly according to a first counting frequency and a first counting range which are based on a frequency band of an output signal of the acceleration sensor;

a second counter configured to perform counting repeatedly, in synchronization with count timing of the first counter, according to a second counting frequency and a second counting range which are based on a frequency band of an output signal of the traveling state detecting sensor;

a count value recorder configured to record a count value of each of the first counter and the second counter; and a judging section configured to judge a state of the output value of the acceleration sensor, wherein the controller is configured to record the output value of the acceleration sensor into the recorder every time when the count value of the first counter meets a first predetermined value, and to record the output value of the traveling state detecting sensor into the recorder every time when the count value of the second counter meets a second predetermined value, and wherein the controller is configured to record the count value of each of the first counter and the second counter, at a time point in which the output value of the acceleration sensor has satisfied a predetermined condition, into the count value recorder, when the judging section has judged that the output value of the acceleration sensor satisfies the predetermined condition.

9. The data recording apparatus for a vehicle according to claim 8, wherein the acceleration sensor comprises a plurality of acceleration sensors, and the first predetermined value of the first counter is individually set for each of the plurality of acceleration sensors, and wherein the traveling state detecting sensor comprises a plurality of traveling state detecting sensors, and the second predetermined value of the second counter is individually set for each of the plurality of traveling state detecting sensors.

10. The data recording apparatus for a vehicle according to claim 8, wherein the acceleration sensor comprises a plurality of acceleration sensors, the first predetermined value of the first counter is set for each of the plurality of acceleration sensors, and the first predetermined value of the first counter set for each of the plurality of acceleration sensors is different each other, wherein the traveling state detecting sensor comprises a plurality of traveling state detecting sensors, the second predetermined value of the second counter is set for each of the plurality of traveling state detecting sensors, and the second predetermined value of the second counter set for each of the plurality of traveling state detecting sensors is different each other, and wherein count timing that the count value of the first counter meets the first predetermined value does not overlap with count timing that the count value of the second counter meets the second predetermined value.

11. The data recording apparatus for a vehicle according to claim 8, wherein the acceleration sensor comprises at least one of a front acceleration sensor which is disposed near the front of the vehicle and detects impulsive force from the front of the vehicle, a central acceleration sensor which is disposed near the center of the vehicle and detects impulsive force from the front, right side and left side of the vehicle, a right side acceleration sensor which is disposed near the right side of the vehicle and detects impulsive force from the right side of the vehicle, and a left side acceleration sensor which is disposed near the left side of the vehicle and detects impulsive force from the left side of the vehicle.

12. The data recording apparatus for a vehicle according to claim 8, wherein the traveling state detecting sensor comprises at least one of a vehicle speed sensor which detects a vehicle speed of the vehicle, an engine rotation sensor which detects the number of rotation of a engine provided in the vehicle, a brake sensor which detects on and off of a brake of the vehicle and an accelerator sensor which detects an open degree of an accelerator of the vehicle.

13. The data recording apparatus for a vehicle according to claim 1, wherein the predetermined condition is that an output value of a specific vehicle state detecting sensor meets a predetermined value or more.

14. The data recording apparatus for a vehicle according to claim 8, wherein the predetermined condition is that the output value of the acceleration sensor meets a predetermined value or more.

15. The data recording apparatus for a vehicle according to claim 11, wherein the predetermined condition is that at least one of an output value of the front acceleration sensor, an output value of the central acceleration sensor, an output value of right side acceleration sensor and an output value of the left side acceleration sensor meets a predetermined value or more.

16. The data recording apparatus for a vehicle according to claim 12, wherein the predetermined condition is that at least one of an output value of the front acceleration sensor, an output value of the central acceleration sensor, an output value of right side acceleration sensor and an output value of the left side acceleration sensor meets a predetermined value or more.

* * * * *